Patented June 3, 1930

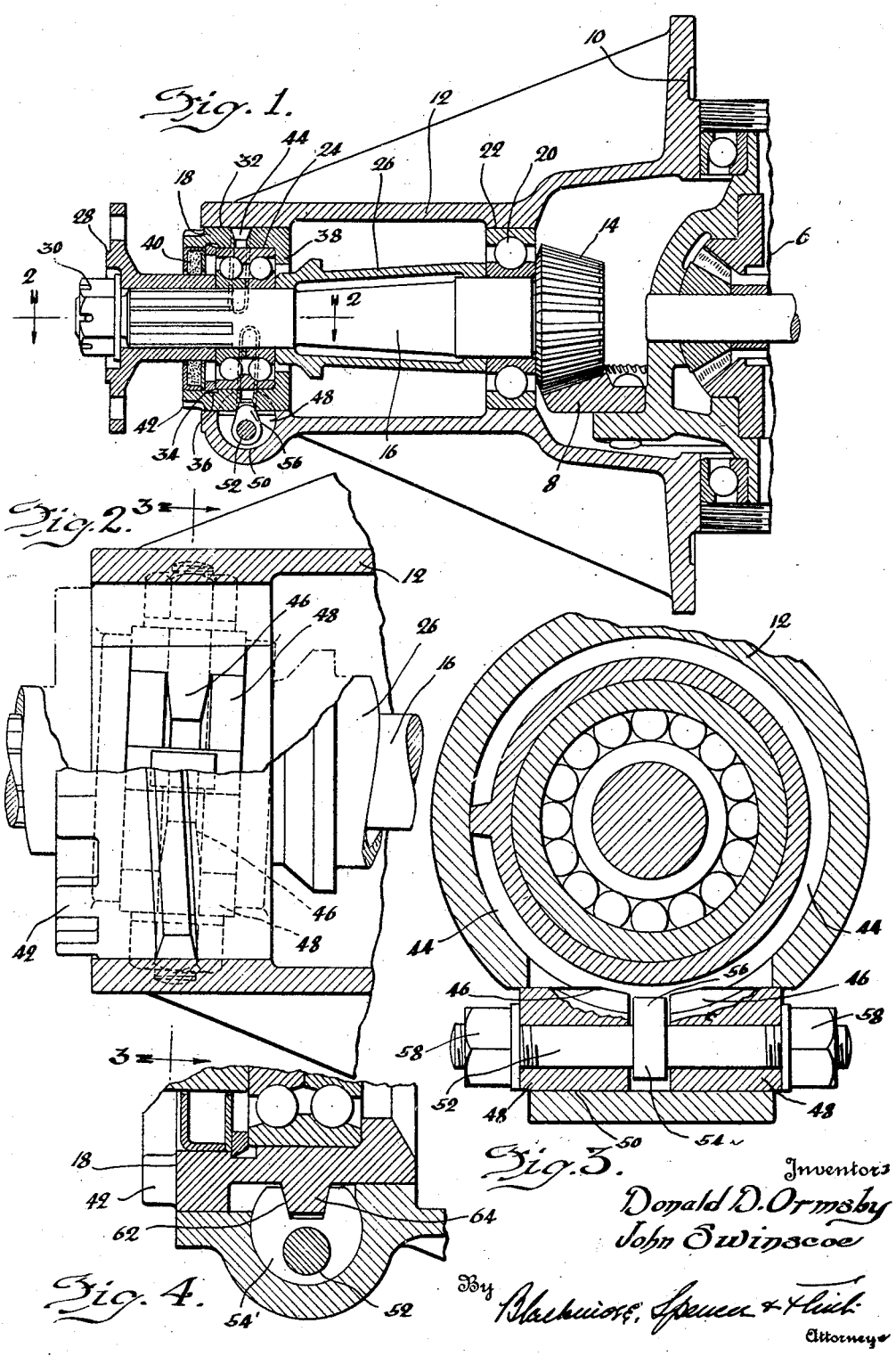

1,761,934

UNITED STATES PATENT OFFICE

DONALD DAMON ORMSBY AND JOHN SWINSCOE, OF SYRACUSE, NEW YORK, ASSIGNORS TO GENERAL MOTORS RESEARCH CORPORATION, OF DETROIT, MICHIGAN, A CORPORATION OF DELAWARE

ADJUSTING DEVICE

Application filed November 7, 1927. Serial No. 231,618.

This invention relates to an adjusting device particularly designed so as to permit fine adjustment of meshing gears to insure quiet and efficient performance. It is particularly adapted for the adjustment of the drive pinion with respect to the ring gear in conventional automobile differential assemblies. To effect this adjustment it has heretofore been customary to mount the pinion shaft in a carrier which is externally threaded so as to screw into the extension of the differential housing provided to receive it. By rotating the carrier, the pinion is caused to advance or recede from the gear. Usually, the carrier is locked in position either by splitting the end of the housing in which the carrier is received and clamping the split end about the sleeve, or by employing a locking plug which engages suitable notches provided in the carrier and locks it in position. The last-named method possesses the disadvantage that very fine adjustment cannot be made and both of the described methods necessitate expensive machining operations on the parts and likewise require that the extension of the differential housing in which the pinion shaft is received be considerably lengthened to house the adjusting means.

Our improved construction affords the finest adjustment and at the same time permits shortening of the housing extension and a reduction in the machining operations involved in the manufacture of the assembly. In other words, we are able to secure a better job at a great reduction in cost as compared with prior designs, this reduction, in the case of small axle assemblies, amounting to as much as $1.50 per assembly.

According to our invention, the rear axle housing or in the case of a banjo-type axle, the plate closing the forward side of the differential recess, is provided as usual with a tubular extension to receive the drive pinion and its carrier but instead of being threaded in the extension, the carrier is merely slidably guided in it. We have provided means for causing the carrier to be advanced or retracted by rotating it. This is accomplished by providing what amounts to a pin-and-slot connection between the carrier and the housing, the slot being inclined in a direction to cause the carrier to be advanced or retracted when rotated. The pin-and-slot connection may take the form of a spiral groove cut in the cylinder and a lug mounted in the housing, or alternatively a spiral thread may be machined on the cylinder and the pin may be bifurcated to receive the thread.

Another improved feature of our invention consists in arranging the lug or lugs so that the parts may be locked in position. This may be accomplished in a number of ways. Perhaps the simplest consists in using several lugs instead of one and making the lugs adjustable transversely of the axis of the carrier so that when both are drawn inwardly, the lugs and the thread or groove are drawn into tight wedging engagement. The lugs are preferably carried by plugs slidably fitted in a cylindrical bore formed in the extension of the rear axle housing and the clamping device consists of a draw-bolt passing through the plugs. A desirable addition to the construction defined consists in forming an abutment on the bolt between the lugs which, if desired, may be shaped to fit the groove or thread, the abutment serving as a knocker when an end of the bolt is tapped to release the plugs from wedging engagement.

This invention is capable of many modifications and certain features may be employed without the others; thus, some other locking means may be employed than that shown in which event the lugs would serve merely to convert rotation of the carrier into axial movement. Where the locking means is not desired, one plug only may be used if preferred. In some cases it may be desired to use our locking means with some other means for effecting axial adjustment of the carrier.

Another feature of our invention consists in the provision of improved means for locking in place the anti-friction bearing which supports the pinion shaft in the carrier. Thus, instead of employing the expensive jam nut heretofore customary, we make use of a simple resilient split ring.

Various other changes will suggest themselves to those skilled in the art.

In the drawings, Figure 1 is a longitudinal section through the differential assembly. Figure 2 is a view taken approximately on line 2—2 of Figure 1 with parts broken away. Figure 3 is a section on line 3—3 of Figure 2, and Figure 4 is a fragmentary view of a modified form of pin-and-slot connection.

The reference character 6 indicates a conventional automobile differential construction including a ring gear 8. The differential is mounted in the usual enlargement provided in the rear axle, not shown. The plate or cover 10 closes the front of the enlargement and is provided with a tubular extension 12 in which the drive pinion 14, its shaft 16 and carrier 18 are mounted.

The inner end of the shaft 16 is supported by anti-friction bearing 20 slidably received in guideway 22 formed in the extension 12. The outer end of the shaft 16 is supported in anti-friction bearing 24. A collar 26 spaces the bearings 22 and 24. Coupling member 28 abuts against the outer edge of the inner race of the bearing 24. When the nut 30 is drawn home on the threaded outer end of the shaft 16, the member 28, bearing 24, sleeve 26 and bearing 22 are locked to the shaft. Bearing 24 is, as stated, received in carrier 18, which is slidable in bearing 32 formed in the outer end of the extension 12. The outer race of the bearing 24 is locked in the carrier 18 by means of the split spring ring 34 fitting in groove 36 provided in the carrier. The ring prevents movement of the race in one direction while an integral flange 38 formed at the other end of the carrier prevents movement of the race in the other direction.

To prevent the escape of oil from the differential assembly, an oil retaining ring 40 of any desired construction is mounted in the outer end of the carrier. The outer surface of the carrier is formed to provide teeth 42 so as to provide means for conveniently rotating it.

In the form shown in Figures 1 to 3, a spiral groove 44 is cut in the outer surface of the carrier 18. In this groove are received lugs 46 in the shape of segments of threads formed upon draw-plugs 48 received in cylindrical bore 50 formed in the extension 12. The plugs 48 are apertured to receive bolt 52 provided between the plugs with an enlargement 54, the upper part of which is preferably formed as at 56 for reception in the groove 44. Nuts 58 are threaded upon the ends of the bolt 52.

The device operates as follows:

With nuts 58 loosened, by engaging a suitable tool with the notches 42, the carrier 32 may be rotated. The rotation would be without effect on the axial position of the carrier were it not that the engagement of the lugs 46 and 56 with the groove 44 convert the rotary movement of the plug into axial movement. To accomplish this function, it is obvious that it is necessary to provide but a single lug 46, or equivalent relatively fixed part. It is likewise obvious that if but one-way axial adjustment is desired, the groove may be dispensed with and a simple inclined or spiral surface or ledge may be formed on the cylinder 32 for co-operation with the lug 46, or equivalent part.

By the provision of two plugs 48 and the clamping means 52—58, I secure an effective means for locking the carrier in adjusted position. Thus the effect of drawing up the nuts 58 is to reduce the diameter of the spiral thread of which the lugs 46 form a part and produce a true wedging engagement of the lugs and groove. Not only do the lugs thus serve to lock the sleeve in place but they also act to resist axial thrusts which may be transmitted to the pinion shaft.

The purpose of the enlargement 54 is this:

After the carrier has been locked in adjusted position, to change the adjustment it is necessary to first loosen the nuts 58 but with this done, it may be found that the plugs are still wedged in position. If now the ends of the bolt 52 are lightly tapped the engagement of the enlargement 56 with the inner ends of the draw-plugs 48 will serve to release the wedging engagement and permit rotation of the carrier.

The form shown in Figure 4 is substantially the same as that shown in the preceding figures except that both the draw-plugs 48 and the enlargement 54' are provided with a slot 62 straddling a thread 64 cut on the carrier 18. This is nothing but a reversal of the parts shown in Figures 1 to 3 in that the thread 64 replaces the groove 44 while the lugs 46 and 54 are grooved or bifurcated as shown.

Obviously the invention is capable of considerable modification. The locking means may be used with some other device for effecting axial adjustment of the carrier, such as conventional screw threads. The pin-and-slot arrangement for effecting axial adjustment of carrier may be used with any preferred form of locking means. Other forms of clamping device may be substituted for the bolt 52 and nuts 58. In some cases, it may be found desirable to omit the enlargement 54'. These and various kindred modifications are covered by the broad terminology of the appended claims.

We claim:

1. A differential assembly comprising a housing member having a tubular extension, a shaft carrying member in the form of a cylinder slidably received in said tubular member, means including an inclined surface on said cylinder and a removable relatively stationary part engaging said inclined surface for effecting axial adjustment of the cylinder upon rotation thereof.

2. In the combination as defined in claim 1 said stationary part and said inclined means being formed to resist end thrusts to which the cylinder is subjected.

3. The combination of a support, a cylindrical bearing member slidably guided in the support, pin-and-slot means associated with the cylinder and support for effecting axial adjustment of the cylinder upon rotation thereof and means for locking said cylinder in adjusted position, said last-named means including parts having wedging engagement with said slot.

4. The combination of a support, a cylindrical bearing member slidably guided in the support, pin-and-slot means associated with the cylinder and support for effecting axial adjustment of the cylinder upon rotation thereof and means for locking said cylinder in adjusted position, said slot being formed in the cylinder and said pin being carried by said support, and said locking means comprising a second pin mounted in said support and engaging said slot and means for drawing said pins together to lock the member in adjusted position.

5. In a differential adjusting means the combination of a support, a cylinder slidably mounted in the support, pin-and-slot means associated with the cylinder and support for effecting axial adjustment of the cylinder upon rotation thereof, wedge means to lock the cylinder in adjusted position and means for releasing said wedge means.

6. In a differential adjusting means the combination of a support, a cylinder slidably mounted in the support and provided with a spiral groove, means engaging the groove to cause axial movement of the cylinder upon rotation thereof, means associated with the groove and said first-named means to lock the cylinder in adjusted position, and means for releasing said locking means.

7. The combination as defined in claim 6, said last named means including a draw-bolt having an enlargement interposed between said groove engaging means to effect their withdrawal from wedging engagement with the groove.

8. In a differential adjusting mechanism, the combination of a support provided with a bore, a differential pinion carrier slidably mounted in said bore, a groove in the carrier, a draw-plug mounted in the support having a tooth in the form of a segment of a thread in engagement with the groove.

9. The combination as defined in claim 8 and means for forcing the tooth into locking engagement with the groove.

10. In a differential adjusting mechanism, the combination of a support provided with a bore, a differential pinion carrier slidably mounted in said bore, a helical groove in the carrier, draw-plugs mounted in the support and provided with teeth in the form of segments of threads in engagement with the groove and means for drawing the plugs into locking engagement with the groove.

11. In a differential adjusting mechanism, the combination of a support provided with a bore, a differential pinion carrier slidably mounted in the bore, a groove in the carrier, and a removable draw-plug mounted in the support and adapted for locking engagement with the groove.

12. In a differential adjusting mechanism the combination of a support provided with a bore, a differential pinion carrier adjustably mounted in the bore, said carrier being provided with an inclined wedging surface on its periphery, and a pair of wedge members carried by said support and engaging said surface, and means for drawing said wedge members together to lock the carrier in adjusted position.

13. In a differential adjusting mechanism the combination of a support provided with a bore, a differential pinion carrier mounted in the bore so as to be adjustable axially thereof, said support being provided with a transverse bore arranged tangentially with respect to said first named bore, said carrier being provided with an inclined surface, and means in said transverse bore having engagement with said inclined surface to hold said carrier in adjusted position.

In testimony whereof I affix my signature.
DONALD DAMON ORMSBY.
In testimony whereof I affix my signature.
JOHN SWINSCOE.